(12) United States Patent
Muradov (10) Patent No.: US 7,375,069 B2
(45) Date of Patent: May 20, 2008

(54) METHOD FOR MASKING AND REMOVING STAINS FROM RUGGED SOLID SURFACES

(75) Inventor: Nazim Z. Muradov, Melbourne, FL (US)

(73) Assignee: Research Foundation of the University of Central Florida, Orlando, FL (US)

(*) Notice: Subject to any disclaimer, the term of this patent is extended or adjusted under 35 U.S.C. 154(b) by 0 days.

(21) Appl. No.: 11/710,338

(22) Filed: Feb. 23, 2007

(65) Prior Publication Data

US 2007/0181167 A1 Aug. 9, 2007

Related U.S. Application Data

(62) Division of application No. 11/145,115, filed on Jun. 3, 2005.

(51) Int. Cl.
*C11D 9/20* (2006.01)
*C11D 7/26* (2006.01)
*C11D 7/20* (2006.01)

(52) U.S. Cl. ............ 510/240; 510/248; 510/253; 510/348; 510/363; 510/434; 510/366; 510/432; 510/477; 134/6; 134/26; 134/22.16

(58) Field of Classification Search ............ 510/240, 510/248, 253, 348, 363, 366, 432, 434, 477
See application file for complete search history.

(56) References Cited

U.S. PATENT DOCUMENTS

| | | | |
|---|---|---|---|
| 4,028,261 A * | 6/1977 | Petersen et al. ............. 134/42 |
| 4,386,004 A * | 5/1983 | Jenkins ..................... 510/240 |
| 4,997,576 A | 3/1991 | Heller et al. ............... 210/748 |
| 5,547,823 A | 8/1996 | Murasawa et al. ......... 430/531 |
| 5,604,339 A | 2/1997 | Tabtabaie-Raissi et al. . 204/157 |
| 5,643,436 A | 7/1997 | Ogawa et al. .............. 205/334 |
| 5,993,097 A * | 11/1999 | DeBaene .................... 401/129 |
| 6,013,372 A | 1/2000 | Hayakawa et al. ...... 428/411.1 |
| 6,156,833 A * | 12/2000 | Rauls ........................ 524/239 |
| 6,337,129 B1 | 1/2002 | Watanabe et al. .......... 428/328 |
| 6,409,821 B1 | 6/2002 | Cassar et al. .............. 106/733 |
| 6,569,520 B1 | 5/2003 | Jacobs ....................... 428/330 |
| 6,645,307 B2 * | 11/2003 | Fox et al. ..................... 134/6 |
| 6,680,135 B2 | 1/2004 | Boire et al. ................. 428/702 |
| 6,809,145 B1 * | 10/2004 | Okamura et al. ........... 524/497 |
| 7,029,374 B2 * | 4/2006 | Chen ........................... 451/41 |
| 2002/0182334 A1 * | 12/2002 | Marzolin et al. ........... 427/421 |
| 2004/0023824 A1 | 2/2004 | Zuechner et al. ........... 510/276 |
| 2004/0149307 A1 | 8/2004 | Hartig ............................ 134/1 |
| 2004/0198625 A1 * | 10/2004 | Mckechnie et al. ......... 510/302 |
| 2004/0255973 A1 | 12/2004 | Chen ............................ 134/1 |
| 2005/0081887 A1 * | 4/2005 | Dalton et al. .................. 134/6 |

OTHER PUBLICATIONS

JP 11300349, Nov. 2, 1999, Tokita, Motofumi, "Method for cleaning water surface contaminated by oil spill" (Abstract).

JP 10310779, Nov. 24, 1998, Kakutani, Tomoji "Photocatalyst devices for treatment and recovery of oil spill on seawater" (Abstract).

JP 08188893, Jul. 23, 1996, Asakawa, Takanobu, "Aqueous detergents for removing oil stains from metal objects" (Abstract).

JP 10176427, Jun. 30, 1998, Matsui, Yutaka, et al., "Removing oil stain from stones", (Abstract).

EP 441481, Aug. 14, 1991, Kerze, Joseph E., "Method for cleaning hydrocarbon-stained hard surfaces" (Abstract).

EP 260135, Mar. 16, 1988, Hatton, John H., "Fluid absorbent composition and method" (Abstract).

JP 2000015110, Jan. 18, 2000, Nakamura, Hiroshige, "Photocatalyst particles for removal of stains on kitchen ware" (Abstract).

WO 2003022462, Mar. 20, 2003, Schutt, John B., "Titanium alkoxide-polysiloxane-based coatings with photocatalytic self-cleaning properties" (Abstract).

CA 978839, Dec. 2, 1975, Parent, Bruno, "Surface de-oxidizing and preserving agent" (Abstract).

Shahed U. M. Kahn, et al., "Efficient Photochemical Water Splitting by a Chemically Modified n-TiO$_2$," *Science*, vol. 297, Sep. 27 (2002) pp. 2243-2245.

Di, Li, et al. "Enhancement of photocatalytic activity of sprayed nitrogen-containing ZnO powders by coupling with metal oxides during the acetaldehyde decomposition", *Chemosphere*, vol. 54 (2004) pp. 1099-1110.

Papaconstantinou, et al. "Photocatalytic Oxidation of Organic Compounds with Heteropoly Electrolytes. Aspects on Photochemical Utilization of Solar Energy" *Homogeneous and Heterogeneous Photocatalysis*, vol. 174, (1986) pp. 415-431.

(Continued)

*Primary Examiner*—Charles I Boyer
(74) *Attorney, Agent, or Firm*—Brian S. Steinberger; Joyce P. Morlin; Law Offices of Brian S. Steinberger, P.A.

(57) ABSTRACT

Methods, compositions and kits for masking and subsequent removal of oil, grease, rust and other stains from a variety of rough solid surfaces, including, but not limited to stone, concrete, asphalt, stucco brick, and ceramic. The methods include coating the stains with an opaque or translucent thin film of a composition that makes the stain practically indistinguishable against the background, exposing the coated stain to the elements, such as, sunlight, air, moisture, resulting in spontaneous transformation, degradation and subsequent removal of the stains from the solid surfaces. The compositions include a photocatalyst by itself or the photocatalyst combined with at least one of, a sensitizer, a dopant, a mediator, a co-reagent, a pigment and a binder. The role of a photocatalyst is to produce highly reactive species or radicals and initiate the degradation of a stain upon exposure to elements, such as, sunlight, air and ambient humidity. Artificial light sources can be used instead of sunlight.

20 Claims, 7 Drawing Sheets

OTHER PUBLICATIONS

Nazim Z. Muradov, et al., "Photooxidative Destruction of Nitroglycerine over UV-Excited Heteropolyacids" *American Chemical Society*, pp. 362-365, Preprint extended abstract, presented at the I&EC Special Symposium Atlanta, GA. Sep. 19-21 (1994).

D. Blake, et al, "Application of the Photocatalytic Chemistry of Titanium Dioxide to Disinfection and the Killing of Cancer Cells" in *Separation and Purification Methods*, vol. 28, (1999), pp. 1-50.

* cited by examiner

METHOD FOR MASKING AND REMOVING STAINS FROM RUGGED SOLID SURFACES

This is a Divisional of application Ser. No.: 11/145,115 filed Jun. 3, 2005.

This invention relates to chemical methods of stain removal from solid surfaces, and in particular to a photocatalytic methods, compositions and kits for masking and removing stains, such as oil, grease, paint, mold, rust and the like from rugged solid surfaces, such as stone, asphalt, stucco, concrete, brick, ceramics, and the like.

BACKGROUND AND PRIOR ART

Stains are unsightly discolored or soiled spots or smudges that occur practically anywhere. Common sources of stains are oil, grease, paint, rust, mold, plants, food and beverages, bird droppings, tire marks, and the like. In most cases, a stain is a result of a chemical reaction or strong interaction, such as, adsorption or chemisorption, between a staining agent and the surface of a solid material.

Lubricating oil (lube-oil) stains on concrete and asphalt driveways are among the most common stains and, unfortunately, most resistant stains. This is due to their high molecular weight and viscosity, low solubility in common solvents and pronounced hydrophobic properties. Chemically, lube-oils present a very complex mixture of long-chain hydrocarbons ($>C_{20}$) and a number of additives including oxidation inhibitors (to prolong the life of the lube-oil), anti corrosion agents (to protect metal from sulphides and other corrosive elements), guards against scoring and galling, anti wear agents (to prevent abrasive and metal to metal contact) and others.

Used lube-oil also contains heavy metals, such as, nickel (Ni), copper (Cu), chromium (Cr), vanadium (V), oxygenates, sulphur compounds and other impurities. Due to an intrinsic chemical inertness of lube-oils, the requisite property of the lube-oil, and the presence of an oxidation inhibitor a lube-oil stain may remain intact for an extended period of time, months and even years. All these factors add to the difficulty of treating and removing lube-oil stains, especially, from rough surfaces.

A rust stain is another common and unforgiving adversary for concrete and other rugged surfaces. Rust stains mainly result from two sources. A first source of rust is water running over metal such as iron and steel and depositing metal oxide particles on the paving or other surfaces. A second source is oxidation of iron-rich compounds in the aggregate of the paving or other surfaces. In principle, rust can be removed via reactions with phosphoric, muriatic, oxalic acids and other acids. Most commercial rust removers contain acids. However, any chemical agent, especially, acid-based, that treats the rust stain would potentially affect the material of the surface sometimes leading to its discoloration or even damage. The stains are particularly difficult to remove from rugged, rough porous surfaces such as those typically occurring in concrete, brick, limestone and other materials. Cement is a versatile and widely used paving and building material, but it is porous and has a very high surface area as reported by V. Ramachandran, et al. in "Removal of Stains from Concrete Surfaces," *Canadian Building Digest. Report CBD*-153, (1973). Stains tend to soak into cement on contact and in some cases may react with the hydrated cement. Some stains, particularly old ones, so strongly adhere to the porous surface of cement that they will resist to any efforts to remove them. As a result, removal of old oil stains from rugged surfaces like those occurring on cement, brick and other porous materials becomes extremely difficult and requires a special treatment.

Known procedures for removing stains from rugged solid surfaces, such as, concrete, include mechanical and chemical methods or a combination of both methods. Mechanical methods include sand blasting, grinding, steam cleaning, brushing, scouring and use of blow torches. In most cases, these procedures are cumbersome, labor intensive and rather expensive, and do not always give a desirable cleaning effect. Depending on the age and severity of the stain these methods may require multiple treatments to get results, which could potentially compromise the integrity of the surface subjected to cleaning.

Existing chemical methods of stain removal from solid surfaces involve the use of special chemicals, solvents, detergents, enzymes and other biological agents. Solvents and detergents dissolve stains, whereas chemical and biological agents react with them leading to their degradation or formation of a compound that will not show as a stain.

The prior art describes a variety of chemical methods for removing organic stains from solid surfaces. For example, Matsui et al. in Japanese Patent JP 10176427 teaches a method for removing oil stain from stones. The method includes coating the oil stain with a paste containing a lipophilic organic solvent and solid powders, covering the surface of the stone by a film, which does not permeate vapors of the solvent, adhering the covering with tapes to prevent the vapor from scattering.

Japanese Patent JP 08188893 to Asakawa describes aqueous detergents for removing oil stains from metal objects. The method involves the use of aqueous detergents containing fat-decomposing enzymes and nonionic surfactants at a ratio of (1-100): (1-1000) and have pH 6.5-10.

European Patent EP 441481 to Kerze discloses a method for cleaning hydrocarbon-stained hard surfaces. The method includes surrounding the stain on the surface with means for containing a liquid in contact with the stain, placing in the containment an organic solvent that is miscible with petroleum hydrocarbons, maintaining the solvent in contact with stain for 1-24 hours, removing the solvent, placing on the surface an adsorbent that does not dissolve the solvent, maintaining the adsorbent in contact with the surface for an additional 1-24 hours, removing the adsorbent material and allowing the treated surface to dry. The author claims that the method is effective in removing motor oil stains from concrete surfaces.

An absorbent composition for removing oils and greases from driveways is described by Hatton in European Patent EP 260135. The absorbent composition comprises an organic material derived from plant gums and plant mucilages and it is applied as a powder, paste or sheet to the liquid spill or the layer to be absorbed. Thus, ground *Plantago psyllium* husk powder was applied to a patch of oil on a concrete surface resulting in removal of the oil after several hours.

Canadian Patent CA 978839 to Parent describes the liquid compositions for removing rust stains from concrete, bricks and ceramics. The composition consists of concentrated phosphoric acid ($H_3PO_4$) (98 wt. %) diluted after mixing with $\leq 0.5\%$ of 1,3-dibutylthiourea and/or 1,3-diethylthiourea and $\leq 0.1\%$ of a nonionic surfactant.

Uemura in Japanese Patent JP 52069827 teaches a method for rust removal using a paste-like agent. The agent comprises silicon dioxide ($SiO_2$) (50-95%), water and/or alcohol, surfactant and a $H_3PO_4$ compound. The rust-removing agent is applied to a metal surface, solidified after 5-10 hours, and easily removed the rust by brushing.

An overview of different methods for removing oil and rust stains from mortar and concrete specimens was reported by Derrington et al. "Removing stains from mortar and concrete." *U.S. Govt. Res. Develop. Rep* 1969, 69/5, 88). It was reported that the most effective method for the removal of rust stains is sandblasting and an application of an oxalic acid solution or sodium citrate-sodium dithionite paste. An application of benzene-calcium carbonate ($C_6H_6$—$CaCO_3$) paste was reportedly the most effective removal method for oil stains among the techniques that were tried. The report also stated that neither of the known methods could completely remove oil and asphalt stains from concrete surfaces.

Thus, the existing chemical approaches to removal of resistant stains from rugged solid surfaces offer rather labor-intensive and costly techniques that involve the use of expensive organic solvents, biological agents (enzymes), special detergents, surfactants, or corrosive agents, such as acids. Moreover, some solvents, such as, benzene, and acid-based agents may have an undesirable environmental footprint. Furthermore, after the stain treatment by the agents, including solvents, detergents, acid-based formulations, and the like, they have to be washed away by copious amounts of water to prevent a secondary staining.

It should also be emphasized that most of the forementioned chemical methods, especially those involving the use of poultices or acid-based formulations, are designed for the treatment of horizontal surfaces and may not be applicable for vertical surfaces. In summary, these methods are cumbersome and costly and in many cases do not give good results, especially in treatment of old lubricant-oil and asphalt stains, making them temperamental or even impractical for some applications.

Turning now to photocatalytic methods for the removal of organic contaminants and oil spills from a variety of solid and liquid (e.g., seawater) surfaces, the prior art provides the following examples.

U.S. Patent Publ. No. 2004/0149307 to Hartig describes a self-cleaning reversible window assembly with photocatalytic (e.g., $TiO_2$) layers deposited on opposite sides of a transparent substrate (glass) so that when exposed to sunlight, the photocatalytic layers chemically degrade organic contaminants deposited on the transparent surface. Similarly, U.S. Pat. No. 6,680,135 to Boire et al. relates to transparent surfaces (e.g., glass), which are furnished with photocatalytic coatings that impart "dirt repellent" properties to the surface.

The transparent $TiO_2$ photocatalytic coatings according to Hartig's and Boire's inventions are produced from titanium-based precursor compounds and would require special equipment and sophisticated application techniques such as magnetron sputtering, pyrolytic coating, chemical vapor deposition, cathodic sputtering, sol-gel techniques, etc. These methods, however, may not be suitable for the application of photocatalytic coatings on out-door surfaces, such as concrete driveways, asphalt pavement, etc.

U.S. Patent Publ. No. 2004/0255973 to Chen discloses a method for cleaning the surface of a semiconductor wafer (after chemical/mechanical polishing) comprising the steps of applying a photocatalyst (e.g., $TiO_2$) containing suspension to the surface and exposing it to UV light (wavelengths less than 380 nm).

U.S. Pat. No. 6,645,307 to Fox et al. discloses cleaning compositions comprising a photocatalytic material (colloidal suspensions of $TiO_2$), a sensitizer (e.g., cationic dye/borate anion complex) and a number of other ingredients. The composition combats soils and/or undesired malodours and microorganisms on fabrics and hard surfaces. The $TiO_2$ colloidal suspensions are produced from precursor materials, e.g., by hydrolysis of tetrachloride or titanium isopropoxide. Similarly, U.S. Patent Publication No. 2004/0023824 to Zeuchner et al. applies insoluble solids such as silica, zinc oxide or $TiO_2$ in solution to hard surfaces such as stone, ceramics, wood and the like to increase hydrophilic properties of the surface so that the removal of soil and soil-release are improved.

U.S. Pat. No. 6,013,372 to Hayakawa, et al. describes a surface coated with an abrasion-resistant photocatalytic coating comprised of a semiconductor photocatalyst, such as $TiO_2$. The coating, when exposed to sunlight, makes the surface hydrophilic and self-cleaning when subjected to rainfall.

U.S. Pat. No. 6,659,520 to Jacobs provides a coating composition for preventing algal growth on building materials. The coating composition is an aqueous slurry containing a silicate binder (e.g., sodium silicate) and a plurality of photocatalytic (e.g., $TiO_2$) particles (particle size 1-1000 nm). The composition is heated, up to 650° C., to produce a ceramic-type coating on granular substrates such as rock, clay, ceramic, concrete, and the like.

U.S. Pat. No. 6,409,821 to Cassar et al. describes a hydraulic binder and cement compositions containing photocatalyst (e.g., $TiO_2$) particles having the improved property of maintaining brilliance and color for architectural concretes. The amount of photocatalyst particles in the composition varied in the range of 0.01-10% by weight with respect to the hydraulic binder.

U.S. Pat. No. 6,337,129 to Watanabe et al. discloses a surface layer composition comprising a photocatalyst (e.g., $TiO_2$), a hydrophobic portion (a water repellent fluororesin) and a hydrophilic portion (a silicone resin or silica) in a solvent (water, ethanol, or propanol). The mixture is spray-coated on the substrate surface and the coating is heat treated at 200-380° C. to form a durable surface layer.

U.S. Pat. No. 5,643,436 to Ogawa et al. describes a metal oxide (e.g., $TiO_2$) layer exhibiting a photocatalytic and anti-soiling function on the surface of inorganic architectural materials (e.g., glass, tile, concrete, stone, etc.). Transition metals (Pt, Pd, Ni, Ru, etc.) or their oxides can be added to promote the photocatalytic reaction. Heat treatment (100-800° C.) is necessary to bind the photocatalyst film to the architectural material.

U.S. Pat. No. 5,547,823 to Murasawa et al. discloses a photocatalyst composite comprising a substrate with the photocatalyst ($TiO_2$) particles and the second component (V, Fe, Co, Ni, et.) adhered to a solid surface (glass, ceramics, wood, metals, etc.) using less degradative adhesive (a fluorinated polymer, a silicon-based polymer, cement, etc.). $TiO_2$ particles are produced from precursors such as titanyl sulfate, titanium tetrachloride, titanium alkoxides and the like by a number of techniques: thermal hydrolysis, neutralization, vapor-phase oxidation. The fixation of the composition to the substrate is accomplished by UV-irradiation, thermal treatment (at temperatures up to 400° C.), using a cross linking agent, etc. Schutt in WO 2003022462 describes titanium alkoxide-polysiloxane-based coatings with photocatalytic self-cleaning properties. A substrate is coated with a polysiloxane-based coating having titanium oxy-groups from a titanium alkoxide bonded to the polysiloxane backbone. The coating gives the substrate self-cleaning properties upon exposure to UV radiation causing organic stains to spontaneously disappear. Upon exposure to UV radiation, photocatalytically induced oxidation reaction causes the spontaneous disappearance of food, oil and other organic stains on buildings and paving materials, such as concrete, limestone or similar surfaces.

Japanese Patent JP 2000015110 to Nakamura et al. describes the method for the removal of stains on kitchenware. The method utilizes the photocatalyst particles comprising $TiO_2$ grains with an average diameter of equal or less than 1 µm which are partially coated (1-20%) by a metal or its alloy selected from Ru, Pt, Au, Cr.

U.S. Pat. No. 5,604,339 to Raissi et al discloses a method for photocatalytic destruction of harmful volatile compounds at emitting surfaces. In a preferred embodiment, a piece of formaldehyde laden wood substrate, for example, paneling or furniture, is treated with $TiO_2$ suspension to form a thin and translucent veneer, which acts as a membrane preventing outward transport of formaldehyde and other harmful compounds produced by weatherization and natural degradation of the substrate.

In addition to the above, another series of patents deal with the photocatalytic degradation of oil spills on seawater. For example, U.S. Pat. No. 4,997,576 to Heller et al. discloses the method for photocatalytic treatment of an oil film (or spill) floating on seawater, which includes dispersing $TiO_2$-coated water-floatable beads (an average diameter of $\leq 2$ mm) on the oil film and allowing the beads to be exposed to solar illumination and air so that the beads accelerate the oxidation of organic compounds in the oil.

Japanese Patent JP 11300349 to Tokita describes a method for cleaning water surface contaminated by oil spill. The method is carried out by floating on the contaminated water surface a water-soluble substrate coated with thin-film semiconductor photocatalyst and porous material (e.g., zeolite), to be contacted with oil pollution for decomposition under light (solar or lamp) radiation.

Japanese Patent JP 10310779 to Takutani describes photocatalyst devices for treatment and recovery of oil spill on seawater. The devices are made of honeycomb-type photocatalysts having multiple cell holes and $TiO_2$ coatings, and the devices are equipped with floats. Oil spills are photocatalytically oxidized and decomposed under solar light radiation.

In summary, the prior art methods offer a variety of approaches, the majority utilize $TiO_2$ as a photocatalyst, to degrade and remove organic contaminants and stains from different surfaces. Potential problems associated with these approaches are as follows. First, most of the techniques utilize rather costly starting materials, such as, metal-organic precursors, polymeric adhesives, micro-beads, and the like. Second, the majority of methods used require special equipment and elaborate preparation techniques to produce the photocatalytic coatings, including, but not limited to, metal-organic synthesis, chemical vapor deposition, magnetron sputtering. Third, in many cases, the binding of the photocatalyst to the treated surfaces requires thermal treatment (100-600° C.), which is not technically feasible for out-door applications in locations, such as, driveways, pavements, exterior walls.

Moreover, the prior art techniques are not conducive to the degradation of organic contaminants occurring on rugged porous surfaces, where an intimate contact between a photocatalytic agent and the stain surface, including the portion hidden in the micro-pores and micro-crevices, is required. Furthermore, there is no indication that the prior art methods could provide an immediate (i.e., right after the initial treatment) masking effect on the stains making them less visible against the surroundings. Lastly, the above photocatalytic techniques are designed for the treatment of different organic stains and are unlikely to treat and remove inorganic stains, such as those caused by rust.

It is also known that conventional paints contain titanium dioxide and other pigments. However, conventional paints are not useful for masking and removing stains for several reasons. First, paints can provide only masking effect, but they do not remove the stains. Second, paints contain a vehicle (such as oil- or lacquer- or latex-based vehicles), in which the pigment is suspended. The vehicle dries and hardens to form an adhesive film of paint on the surface. This film is practically permanent and over extended period of time (months and years) its masking effect might diminish as the surroundings change color due to aging and exposure to traffic. Thus, paints are not useful for masking and removing stains.

Thus, there is a need for an efficient, simple, user-friendly, care-free and environmentally benign method for the removal of a variety of tough stains from rugged porous surfaces (both horizontal and vertical) such as concrete, stone, brick, stucco, and the like. It is also highly desirable that the method provides an immediate masking effect on the stain via blending the stain with the surrounding area and making it practically invisible.

SUMMARY OF THE INVENTION

A primary objective of the present invention is to provide methods, compositions, and kits for removal of oil, grease, paint, mold, rust and other tough stains from rough porous solid surfaces such as but not limited to concrete, stone, asphalt, stucco, brick, ceramics, and the like.

A secondary objective of the present invention is to provide methods and kits that can include a composition that can be applied to a stain in the form of a thin opaque or translucent film providing a masking effect on the stain.

A third objective of the present invention is to provide methods, compositions and kits for making a stain on a rough porous solid surface become practically invisible against the background.

A fourth objective of the present invention is to provide a composition that when applied to a stain is capable of facilitating its transformation and degradation upon exposure to the elements, including sun, air, rain and ambient humidity.

A fifth objective of the present invention is to provide a kit that can be used to mask and/or remove stains from rugged, solid surfaces.

A preferred method is disclosed for masking and subsequent removal of oil, grease, rust and other stains from a variety of rough solid surfaces, including, but not limited to, stone, concrete, brick, and wood. The method includes coating the stains with an opaque or translucent thin film of a composition that makes the stain practically indistinguishable against the background, exposing the coated stain to the elements, such as, sunlight, air, moisture, resulting in spontaneous transformation, degradation and subsequent removal of the stains from the solid surfaces.

The composition can include a photocatalyst by itself, or the photocatalyst with one or more components selected from the following: a sensitizer, a dopant, a mediator, a co-reagent, a pigment and a binder. The role of a photocatalyst is to produce highly reactive species or radicals and initiate the degradation of a stain upon exposure to the elements, such as, sunlight, air and ambient humidity. Artificial light sources can be used instead of sunlight; the light wavelength of the artificial light source is preferably in the range from approximately 250 nanometers (nm) to approximately 800 nm, more preferably, approximately 365 nm to approximately 580 nm.

The role of a sensitizer is to extend the light absorption of UV-sensitive photocatalysts to visible area of the solar spectrum, and, thus, enhance the photocatalytic action of the materials.

The role of a dopant is to facilitate oxidative degradation of the stain constituents via redox transformations in the presence of air and water.

The role of a mediator is to facilitate the contact between the constituents of the stain and the photocatalyst.

The role of a co-reagent is to transform the constituents of the stain into a form that could be more efficiently degraded or will not show as a stain.

The role of a pigment is to impart to the composition a color that will mask the stain against the surroundings until the stain completely degrades and disappears from sight.

The opacity of the thin film is controlled by the nature of the photocatalyst and the pigment used, size of particles, thickness of the film. For example, titanium dioxide ($TiO_2$) nanopowder (Degussa P25) with an average particle size of approximately 30 nm in diameter produces translucent films, whereas, $TiO_2$ with an average particle size of approximately 1 micron (µm) produces opaque films. Adding pigments, such as $Fe_2O_3$, increases the opacity of the film. Likewise, increasing the thickness of the film increases the opacity.

The components in the thin film can be varied, other than the photocatalyst, the other ingredients are used as desired and in varied amounts, by a person of skill in the art to vary the functionality of the composition. In some cases, the composition could consist of only one ingredient, a photocatalyst suspended in a solvent or in the matrix of a binder.

In many cases, the same component of the composition can perform several functions. For example, the same component can act as a photocatalyst and as a pigment. The disclosed method includes applying a durable thin film of the composition that is stable under exposure to elements, such as, sun, wind, rain and mechanical action (e.g., walking or driving over the film) for an extended period of time of weeks and months, during which the stains usually disappear from sight.

Follow-up treatment may be required if the coating is weathered out by rain or heavy traffic before the stain is completely removed. When a stain is not completely removed, a new coating or thin film of the composition needs to be applied over the stain surface. There is also a possibility that the coating may still be visible after the stain is removed; if so, the residual coating could be removed by hosing or brushing with soap and water.

The method of the present invention is particularly advantageous for the masking and/or removal of old tough stains that are most difficult or sometimes, impossible to remove by conventional techniques and existing commercial products. The difficult stains include, but are not limited to, old lube-oil stains, tire marks on concrete, asphalt driveways and pavements.

Further objects and advantages of this invention will be apparent from the following detailed description of the presently preferred embodiments, which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The present invention provides a method for masking and subsequent removal of a variety of stains, such as, lubricating oil, grease, rust, mold and the like, from rugged porous surfaces, including, but not limited to, stone, concrete, brick and stucco with improved efficiency, ease and convenience compared to conventional techniques. The method includes coating the stains with an opaque or translucent thin film of a composition that makes the stain difficult to distinguish from the background, and exposing the film-coated stain to an outdoor environment with sunlight, air, ambient humidity, resulting in spontaneous transformation, degradation and subsequent disappearance of the stains from a variety of solid surfaces.

To be suitable for stain masking and removal, the composition of the present invention has to meet the following requirements. First, the composition has the ability to induce photo-oxidation reactions upon exposure to ultraviolet (UV) and/or visible light. Second, the composition has high photo- and chemical stability. Third, the composition has the ability to produce a durable thin film with high opacity and good adhesion to different surfaces, including hydrophobic surfaces.

There are two preferred embodiments of the present invention, a liquid phase composition and a solid phase composition. According to a first embodiment, the composition can include one or more components selected from a photocatalyst, a sensitizer, a dopant, a mediator, a co-reagent and a pigment suspended in a solvent.

According to a second embodiment, the composition can include the photocatalyst combined with one or more components selected from a sensitizer, a dopant, a mediator, a co-reagent, a pigment and a binder.

The photocatalyst can be selected from the group of compounds containing zinc (Zn), titanium (Ti), molybdenum (Mo) and tungsten (W). The photocatalyst can also be selected from one of titanium dioxide ($TiO_2$), zinc oxide (ZnO), and a mixture of $TiO_2$ and ZnO.

The method for applying the two embodiments of the present invention requires the application of a thin film of the composition onto the stain surface. In a first embodiment, a thin film is formed by applying a liquid suspension of the composition in a solvent to a stain and subsequently, vaporizing the solvent. Vaporizing occurs when exposed to ambient or outdoor temperatures and pressures.

The application of the liquid suspension to a stain can be accomplished by spray-coating, dripping, or sprinkling the composition onto the stain surface, or by soaking a sponge or a cloth, or other liquid-absorbing material with the suspension and rubbing it on the stain surface.

Any technique that can produce a thin film over the stain surface is acceptable, for example, coating with a brush, sponge, cloth, sprinkling, sputtering, spraying from a pressurized can and the like. It is preferable that the liquid suspension be applied in such a manner that it exactly covers the footprint of the stain. This could be achieved by starting the application in the middle of the stain and slowly moving outward.

In a second embodiment, a solid composition in the form of a loose powder, pellets, or a solid bar is applied to the stain surface by sputtering or, in the case of a bar, by shading followed by rubbing the composition onto the stain surface with a sponge, cloth or other liquid-absorbing material wetted with a solvent. Rubbing a solid bar is similar to using chalk on an asphalt or concrete surface.

A solvent is used in both embodiments of the present invention and can include water, organic solvents or water-organic solutions. Non-limiting examples of an organic solvent include ethanol, isopropanol, acetone, octane, and mixtures thereof. The solvent does not have a chemical function in the removal or masking of a stain. The role of a solvent is to help create a uniform thin film or coating on the surface of the stain.

The role of a photocatalyst is to initiate degradation or decomposition reactions of organic compounds composing the stain upon exposure to the elements, such as sunlight or an artificial light source, air and moisture or ambient humidity. The degradation of staining agents occurs via interaction of the organic molecules in the stain with the radicals and/or other active species produced by the photocatalyst upon exposure to the elements. The photocatalyst is selected from a number of semiconductors (SC) or metal complexes capable of absorbing ultraviolet (UV) and/or visible photons and producing reactive species participating in photo-degradation reactions. Non-limiting illustrative examples of photocatalysts include zinc oxide (ZnO), titanium dioxide ($TiO_2$), strontium titanate ($SrTiO_3$), tungsten oxide ($WO_3$), silicotungstic acid ($H_4SiW_{12}O_{40}$) and other materials, preferably, ZnO and $TiO_2$.

Current scientific theory holds that upon exposure to photons, air and moisture, SC-based photocatalysts (e.g., $TiO_2$) generate a variety of reactive oxidizing species shown in chemical reaction (1):

$$TiO_2 + photons + O_2 + H_2O \rightarrow (TiO_2) + OH \cdot, HO_2 \cdot, H_2O_2 \quad (1)$$

These oxidizing species are capable of attacking organic molecules causing destructive oxidation and, ultimately, decomposition into smaller molecules such as carbon dioxide ($CO_2$), carbon monoxide (CO), methane (CH4), water ($H_2O$), predominantly, $CO_2$ and $H_2O$, as shown in reaction (2):

$$OH \cdot + C_xH_yO_z + O_2 \rightarrow \rightarrow \rightarrow CO_2 + H_2O \quad (2)$$

where, $C_xH_yO_z$ denotes an organic molecule and $\rightarrow \rightarrow \rightarrow$ the sequence of reactions.

In the case of hydrocarbon-based staining agents, such as, lube-oil, the staining agents are initially photooxidized into oxygenated compounds, such as, alcohols, ketons, or organic acids, as shown in reaction (3):

$$OH \cdot + C_nH_m + O_2 \rightarrow C_{n-x}H_{m-y}O_z \quad (3)$$

where, $C_nH_m$ and $C_{n-x}H_{m-y}O_z$ are the original and oxygenated long-chain hydrocarbons, respectively.

The oxygenated reaction products have higher solubility in water than the original hydrocarbons, and consequently, can be more easily washed out from the surface by rain or water-hosing, thus facilitating the disappearance of the stain from the surface.

Several metal-complex photocatalysts, such as, polyoxometalates (POM), are also capable of oxidative degradation of organic compounds in the presence of molecular oxygen when exposed to solar photons. POM are transition-metal oxygen-anion clusters with general formula of. $[X_xM_mO_y]^{q-}$, where M is usually molybdenum (Mo) or tungsten (W), less frequently, vanadium (V), niobium (Nb), tantalum (Ta) and X is a heteroatom.

Of particular interest are POM of tungsten (e.g., $[XW_{12}O_{40}]^{q-}$, where X is P, Si, Fe, and q=3 through 7) that photocatalyze the oxidation of a wide range of organic compounds, such as, alcohols, esters, organic acids, and the like. Papaconstantinou et al, *Homogeneous and Heterogeneous Photocatalysis*, D. Reidel Publ. Co., Dordrecht, pp. 415-31 have reported the oxidation reactions of organic compounds. Muradov et al. reported on the solar photocatalytic decomposition of nitrate esters in the presence of $H_4[SiW_{12}O_{40}]$—$TiO_2$ binary system in *Amer. Chem. Soc., I&EC Sixth Annual Symposium on Emerging Technologies in Hazardous Waste Management*, Atlanta, Ga., (1994).

The mechanism of POM-catalyzed photodegradation of organic compounds is different from that of semiconductor-catalyzed reaction and involves the photoinduced charge transfer in the photoactive $W^{VI}=O$ group resulting in the formation of a reactive electron-deficient radical-like specie ($W^V=O \cdot$) capable of attacking organic compounds, as shown in reactions (4) and (5) below:

$$W^{VI}=O + photons \rightarrow W^V=O \cdot \quad (4)$$

$$W^V=O \cdot + C_xH_yO_z + O_2 \rightarrow \rightarrow \rightarrow W^{VI}=O + CO_2 + H_2O \quad (5)$$

where, $W^{VI}=O$ is a fragment of POM molecule.

Similar to $TiO_2$ and ZnO, POM are sensitive to UV photons with wavelengths less than 400 nm and can accomplish solar-catalyzed degradation of organic compounds. Thus, in principle, both types of photocatalysts, semiconductors and metal-complexes are applicable to the treatment of outdoor as well as indoor stains. In the case of indoor stains, light sources such as conventional black light and cool white fluorescent lamps can be used.

The role of a sensitizer is to extend the absorption band of UV-sensitive photocatalysts (e.g., $TiO_2$, ZnO) into visible area of the solar spectrum, and, thus, enhance the photocatalytic action of the materials. The band gaps of $TiO_2$ (rutile form), $TiO_2$ (anatase form) and ZnO are 3.0, 3.2 and 3.2 eV, respectively, which makes them sensitive to near-UV radiation, for example, wavelengths equal or less than 385 nm present in solar spectrum (about 5% of the total spectrum).

It is possible, however, to sensitize these semiconductors to visible photons with wavelengths more than 400 nm and, thus, increase the rate of solar-assisted decomposition of organics. For example, the light absorption by $TiO_2$ nanoparticles doped with carbon can be extended well into the visible area as discussed by Kahn et al., *Science*, v. 297, p. 2243, 2002. A similar effect was reported by Li and Haneda in *Chemisphere*, v. 54, p. 1099, (2004) who found that the sensitivity of ZnO photocatalyst toward visible light could be enhanced by doping it with nitrogen.

Due to the strong oxidizing action of the UV-excited photocatalysts, the sensitizers have to be resistant to oxidation and photodegradation. Non-limiting examples of a sensitizer include metal-organic complexes and dyes such as tris (2,2'-bipyridyl) ruthenium (II) chloride, cis-$RuL_2(SCN)_2$ (where, L is 2,2'-bipyridyl-4-4-dicarboxylate), porphirin and phthalocyanin complexes of metals, including, but not limited to zinc (Zn), iron (Fe), copper (Cu). The sensitizers have to be immobilized on the surface of the photocatalyst prior to mixing it with other components of the composition.

Light sources other than sunlight could also be used for the excitation of the photocatalysts. These sources include low, medium and high pressure mercury, xenon arc, metal halide, fluorescent black light with emission maximum at about 365 nm and cool white fluorescent light with peak output at about 580 nm lamps.

The role of a dopant is to facilitate the oxidation and degradation reactions involving stain components via redox transformations in the presence of oxidants, such as, oxygen, hydrogen peroxide, organic peroxides, and the like. Transition metals and their compounds, including oxides and salts are among most efficient dopants. Non-limiting examples of a dopant include Pt, Pd, Ag, $RuO_2$, $Fe_2O_3$, $Fe_3O_4$, $FeCl_3$, CuO, CoO, $SnO_2$, $Zn(OAc)_2$. Dopants facilitate the photodegradation reactions by catalyzing the electron-transfer reactions between the photocatalyst and organic molecules, and participate in non-photolytic redox reactions leading to formation of reactive species. The last factor could play a major role in additional formation of OH radicals from hydrogen peroxide ($H_2O_2$) in the presence of iron-based dopants via Fenton reaction (6) below:

$$H_2O_2 + Fe^{2+} \rightarrow OH\cdot + OH^- + Fe^{3+} \qquad (6)$$

The importance of this reaction is that it can occur in the areas, such as pores and crevices, not reachable by photons.

The role of a mediator is to facilitate the contact between the constituents of a stain, a photocatalyst, air and water, and, thus, facilitate the degradation reaction. Non-limiting illustrative examples of a mediator include molecular sieves (zeolites), silica gel, activated carbon (AC), carbon black (CB). The accelerating effect of zeolites, silica gel and AC could be attributed to their ability to adsorb and retain relatively large amount of water, thus promoting reaction (1) supra. The positive effect of AC and CB can be explained by their hydrophobic properties, which in some cases (e.g., lube-oil) facilitates the interaction of the stain with the reactive species.

The role of a co-reagent is to transform the constituents of the stain into a form that can more efficiently degraded or not show as a stain. Non-limiting examples of a co-reagent include oxalic acid, citric acid, sodium citrate, potassium hydrogen tartrate, sodium phosphate, sodium hydrosulfite. The function of a co-reagent is best illustrated in the case of a rust stain removal. In this case, a co-reagent (e.g., oxalic acid) reacts with the hydrated ferric oxide, FeO(OH), the main component of a rust stain, converting the rust stain into water-soluble ferric oxalate, $Fe_2(C_2O_4)_3$. Under exposure to solar radiation, ferric oxalate is photo-degraded into iron oxide in the presence of a photocatalyst, such as, $TiO_2$, as shown in reactions (7):

$$\tfrac{1}{2}Fe_2(C_2O_4)_3 + TiO_2 + O_2 + photons \rightarrow FeO/TiO_2 + 3CO_2 \qquad (7)$$

As a result, the staining agent (i.e., hydrated iron oxide) is transformed and transferred from the treated surface onto the $TiO_2$ surface. It should be noted that oxalic acid alone can also remove a rust stain (see the discussion of a prior art), but in this case the resulting iron oxalates have to be immediately washed away from the surface by copious amount of water to prevent a secondary staining and also to remove the unreacted oxalic acid. In contrast, the disclosed method does not require immediate washing of the treated area. After the deposition of iron oxides on $TiO_2$ surface, the deposits will become less visible compared to the original stain, and eventually they will weather out leaving behind the rust-free surface, and the unreacted oxalic acid will be photocatalytically decomposed into carbon dioxide ($CO_2$) and water ($H_2O$).

The role of a pigment is to impart to the composition a color that will mask the stain (i.e., by blending it in the surrounding area) until it completely degrades and disappears from a sight. Non-limiting examples of a pigment are: $TiO_2$, ZnO, $Fe_2O_3$, $Fe_3O_4$, $NiFe_2O_4$, activated carbon, carbon black, etc: Both $TiO_2$ and ZnO have very high refractive index (which determines the opacity), that makes them two of the most widely used white pigments in paints, ceramics, cosmetics, paper, and the like.

Due to their high opacity, relatively thin films of these compounds would provide an adequate masking effect for most of the dark-colored stains, such as, lube-oil, tire marks, mold, and the like. In some cases, the $TiO_2$- or ZnO-based coatings may be too bright (especially, on a gray concrete surface), which will necessitate the addition of other pigments to provide a better color match with the treated surface. The addition of $Fe_3O_4$, or AC, or CB will impart to the composition any desirable shade of gray. If the stain occurs on a red brick surface, $Fe_2O_3$ can be added to the composition. The treatment of stains on beige or light-brown surfaces may require the addition to the formulation of a small amount of $NiFe_2O_4$.

The role of a binder (which is used in the second embodiment of the invention) is to bind all the ingredients into a solid composition that can be formed into any desired shape, e.g., a rectangular bar, a cylinder, a sphere, a cone, etc. Non-limiting illustrative examples of a binder are white Portland cement, gypsum, ceramic cement, stucco, marcite, etc.

Tables 1 and 2 below provide a generic liquid and solid phase compositions of the present invention, respectively.

TABLE 1

Liquid Stain Masking and Removal Composition

| Component | Function | Concentration range, wt. % |
|---|---|---|
| Titanium dioxide | photocatalyst | 0.1-40 |
| tris (2,2'-bipyridyl) ruthenium (II) chloride | sensitizer | 0.001-5 |
| Platinum | dopant | 0.001-5 |
| Silica gel | mediator | 1-20 |
| Oxalic acid | co-reagent | 1-20 |
| Iron oxide ($Fe_2O_3$) | pigment | 0.1-10 |
| Ethanol | solvent | 40-99.9 |

TABLE 2

Solid Stain Masking and Removal Composition

| Ingredient | Function | Concentration Range, wt. % |
|---|---|---|
| Titanium dioxide | photocatalyst | 1-70 |
| tris (2,2'-bipyridyl) ruthenium (II) chloride, | sensitizer | 0.1-5 |
| Tin oxide ($SnO_2$) | dopant | 0.01-5 |
| Silica gel | mediator | 1-20 |
| Oxalic acid | co-reagent | 1-40 |
| Iron oxide ($Fe_2O_3$) | pigment | 0.1-10 |
| White Portland cement | binder | 30-99 |

In many cases, the same component of the composition can perform two or even 15 more functions. For example, $TiO_2$ can act as a photocatalyst and a pigment; activated carbon (AC) functions as a mediator and a pigment; ferric oxide ($Fe_2O_3$) can be used as a dopant and a pigment. Advantageously, some components of the disclosed composition have pronounced anti-fungal characteristics, which may be beneficial in treatment of mold-related stains. For example, the anti-bacterial and anti-fungal effect of $TiO_2$, which destroys a cell membrane, are well known as disclosed by D. Blake et al, in *Separation and Purification Methods*, vol. 28, pp. 1-50, (1999). Zinc oxide (ZnO) is widely used as a mold-growth inhibitor in paints. Copper and silver, which could also act as dopants, are known for their anti-fungal and antibacterial properties.

It should be noted that in some cases, the treatment of a stain by the disclosed method is limited to a masking effect only, without complete decomposition and removal of the stain. This takes place when a staining agent and the material of the stained surface are of similar chemical nature, which results in fusing or absorbing the stain into the material. Widely occurring lube-oil stains on asphalt surface is a case in point. Both lube-oil and asphalt are predominantly high-molecular weight hydrocarbons, therefore asphalt readily absorbs lube-oil by volume (in contrast, concrete adsorbs lube-oil by surface). This makes decomposition and removal of lube-oil from asphalt practically impossible. However, due to its good masking characteristics (high opacity, strong adhesion to the stain and durability), the coating according to the present invention makes the lube-oil stain practically invisible against the background for several months; after that it may require additional coatings.

We note here that the inventive composition for masking and removing stains profoundly differs from conventional paints containing titanium dioxide or other pigments. As discussed in the background section paints can provide only masking effect, but they do not remove the stains. Paints contain a vehicle (such as oil- or lacquer- or latex-based vehicles), in which the pigment is suspended. The vehicle dries and hardens to form an adhesive film of paint on the surface. This film is practically permanent and over extended period of time (months and years) its masking effect might diminish as the surroundings change color due to aging and exposure to traffic. In contrast, the novel composition does not contain any vehicle, and the coating will eventually weather out concurrent with the disappearance of the stain. Any residual coating may be easily washed away with brush and soap.

Figure 1:
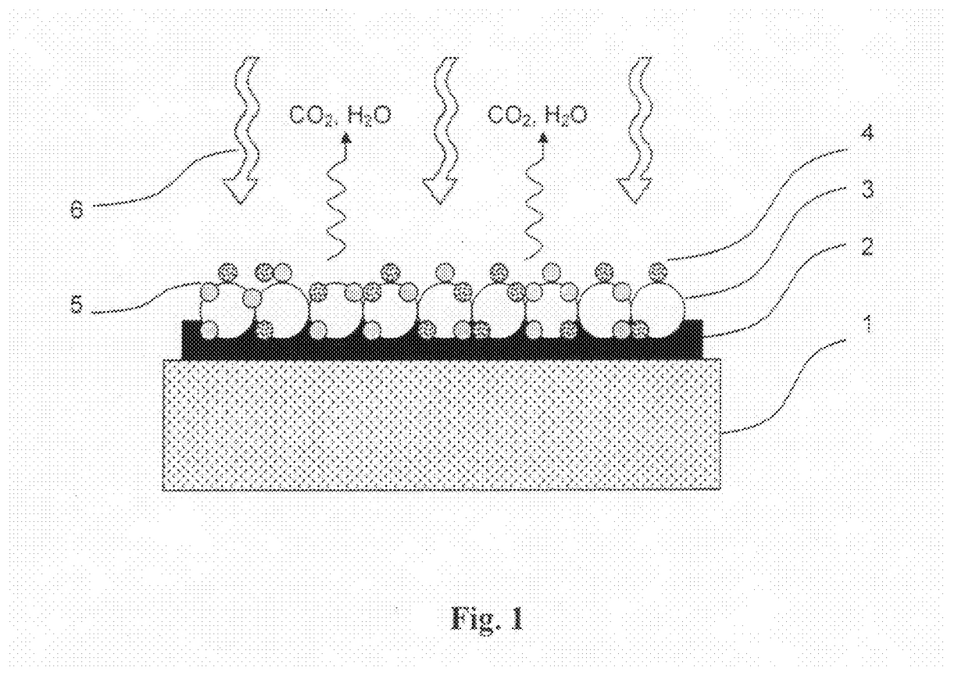
FIG. 1. is a schematic representation of the composition film applied to the surface of an oil stain occurring on a substrate.

Reference is now made to FIG. 1, which illustrates the inventive concept by providing a schematic diagram of the film composition applied to an oil stain occurring on a solid surface or substrate, 1. For the sake of simplicity, the shown composition comprises a plurality of photocatalyst 3, a dopant 4 and a pigment 5 particles. As illustrated in FIG. 1, upon exposure to solar photons 6, the composition film degrades the stain 2 into $CO_2$ and $H_2O$. The method is particularly advantageous for the masking and/or removal of the stains that are most difficult, sometimes, impossible to remove by conventional techniques and existing commercial products. The difficult stains include, but are not limited to, old lube-oil stains and tire marks on rough porous surfaces such as concrete, asphalt driveways, pavements and parking lots.

Figure 2A:
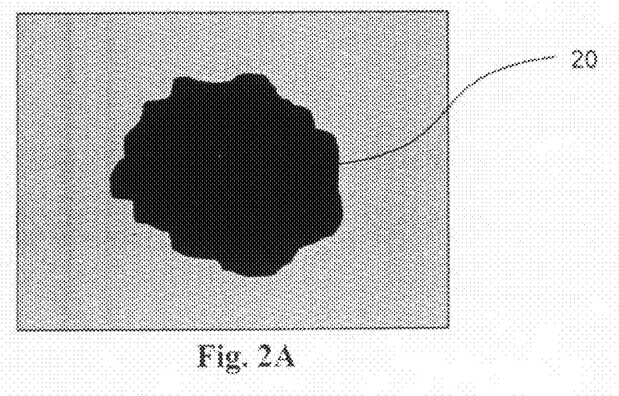
FIG. 2A is an illustration of an area of concrete with an original oil stain on the surface.
Figure 2B:
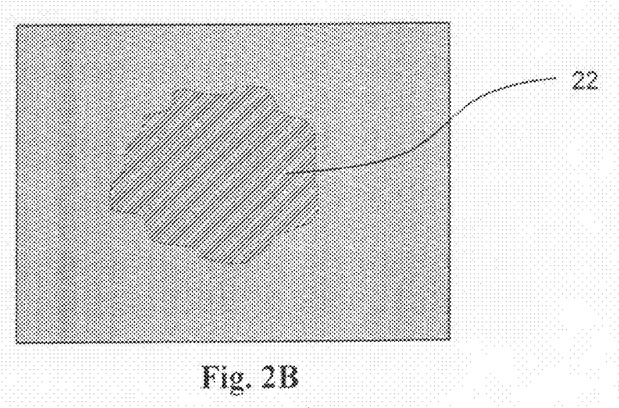
FIG. 2B is an illustration of the oil stain in FIG. 2A immediately after coating with a thin film of the composition of the present invention.
Figure 2C:
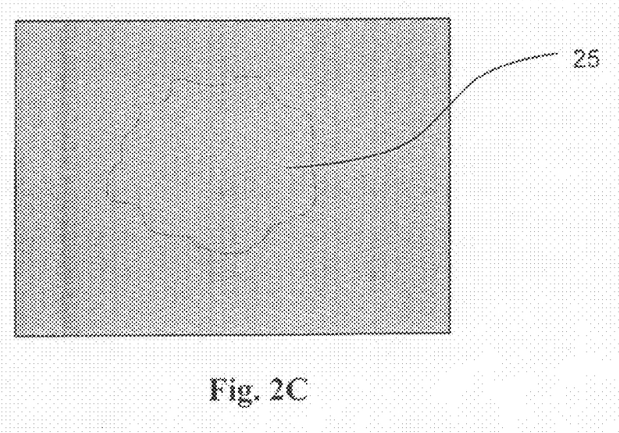
FIG. 2C is an illustration of an area of concrete after the coated stain has been exposed to the elements for one month.

The disclosed method includes the application of a durable thin film of a composition that is stable under exposure to elements, such as sun, wind, rain and mechanical action including, walking or driving over the film for extended period of time, such as, weeks and even months, during which the stains usually disappear from sight. Referring now to FIGS. 2A, 2B and 2C, there is an illustration of the three phases of the soil masking and stain removal process of the present invention. In FIG. 2A there is an original oil stain 20 on a concrete surface, FIG. 2B shows the stain 22 coated with a thin film of the composition of the present invention and FIG. 2C shows the area of the stain 25 after exposure to the elements for approximately 30 days. The stain is the same color as the background surface.

With regard to the treatment of various rugged, solid surfaces, a rugged surface is not necessarily porous. For example, asphalt surface is rugged but not porous, unlike concrete and brick that have porous surfaces. The minimum pore size is determined by the size of photocatalyst particles, such as approximately 30 nm to approximately 1000 nm. There is no maximum measure of pore size, in fact, the surfaces with larger pores are easier to treat because of better exposure to solar photons.

The invention can also be used for a variety of indoor applications, including, but not limited to, a clean-up job in a garage, kitchen, patio, or swimming pool. For the indoor applications, there may be a need for an artificial light source, such as, fluorescent white cool or black light lamps. The light sources used for the removal of indoor stains, such as, in areas where exposure to direct solar radiation is not possible, would require wavelengths in a range from approximately 250 nanometers (nm) to approximately 800 nm, preferable, approximately 365 nm to approximately 580 nm. The exposure time depends on the toughness of the stain and may range from approximately 24 hours to approximately 30 days.

The present invention offers many advantages over the prior art, including, but not limited to, a pronounced masking effect of the disclosed composition film that causes a stain to become practically invisible against the background immediately upon the application of the film. The method of using the composition is passive and care-free; no action is necessary after applying the film, the stain will spontaneously disappear upon exposure to an outdoor environment with sunlight, air, and moisture. The application of the film is very simple and hassle-free. The method of using the composition is applicable to a great variety of organic and inorganic stains occurring on rough and rugged surfaces, both horizontal and vertical. There is no need for immediate attention to the treated surface, such as, washing or scrubbing the surface, removing excessive chemical reagents, and the like. In addition, all the reagents of the disclosed composition are inexpensive, widely available and safe to humans, animals and the ecosystem.

Figure 3:
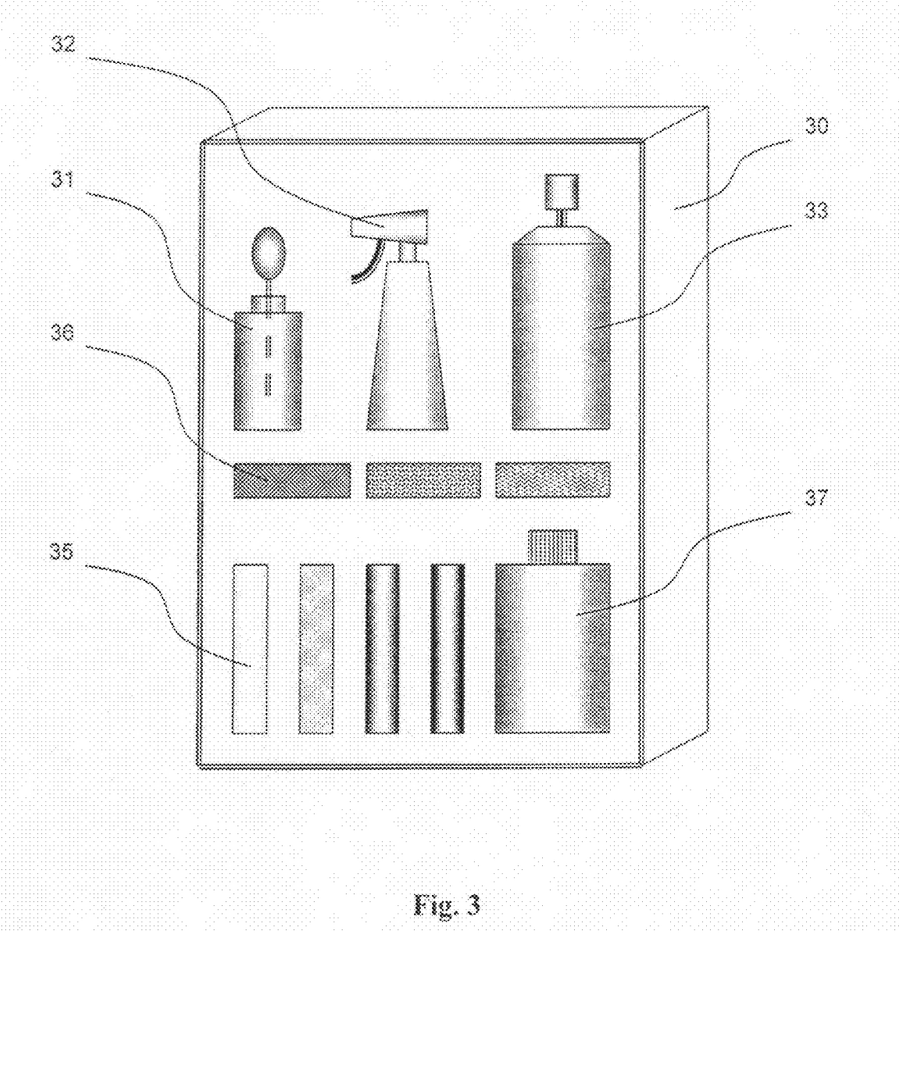
FIG. 3 is an illustration of a stain masking and removing kit of the present invention.

All the above features make it very easy and convenient to treat a variety of stains on rugged surfaces by using a novel stain removal kit. In FIG. 3, the stain masking and removing kit is shown. The kit can include a dropper 31 (for the treatment of small areas), a sprayer 32 and a pressurized spray can 33 (for the treatment of medium and large areas), all filled with a liquid composition, as disclosed in Table 1 above. The liquid composition contains a separate photocatayst, a separated liquid solvent, and a separated pigment, wherein a user unites a portion of the phoyocatalyst with a portion of the liquid solvent and a portion of the pigment to match the color of a background surface that has a stain of a different color than the background surface.

The kit also includes a plurality of solid compositions in the form of cylindrical bars of different color 35 (looking like colored chalks) that are designed for the treatment of stains occurring on colored surfaces (e.g., ornamental concrete, bricks and the like), as disclosed in Table 2 above. The solid composition contains a separate photocatalys, a separate binder, and a separate pigment, wherein a user units a portion of the photocatalyst with a portion of the pigment to match the color of a background surface that has a stain of a different color than the background surface and uses a hinder to bind the ingredients into a solid composition that can be formed into a desired shappe.

Several pieces of cloths, sponges and other liquid absorbing materials 36, along with the bottle of a solvent 37 are also included in the kit as an applicator for applying a durable thin film of the liquid or solid composition to a surface. The kit can contain both liquid and solid formulations for the treatment of stains of different nature, e.g., lube-oil, tire mark, rust, mold and the like. All the above articles can be enclosed in a case 30 such as but not limited to a hand carriable box, a carton, a bag, and the like.

The examples below are non-limiting and for illustration purposes only. Other uses of the invention will be apparent from the disclosure to one skilled in the art.

EXAMPLE 1

Figure 4A:
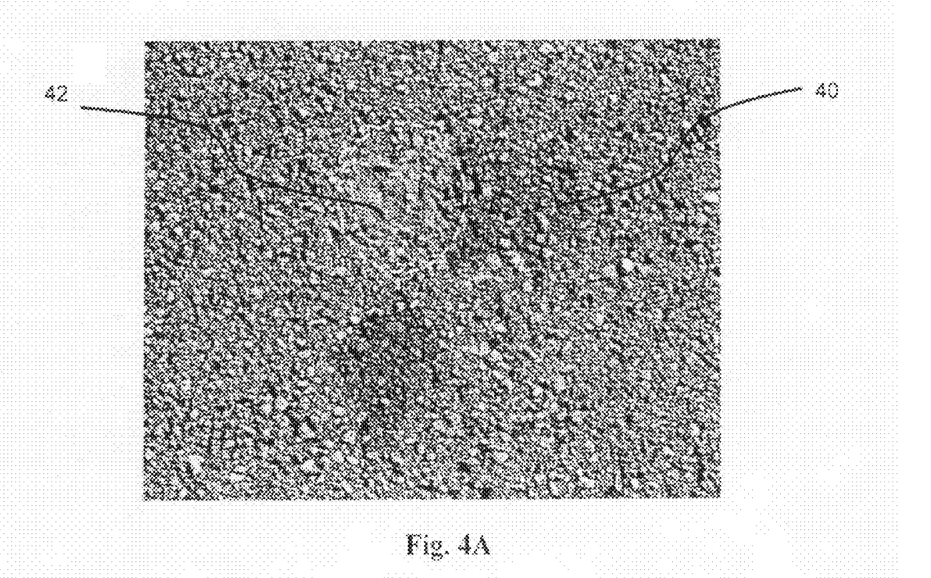
FIG. 4A is a photograph of a lube-oil stain on an asphalt driveway immediately after applying the $TiO_2$ film as a liquid suspension.
Figure 4B:
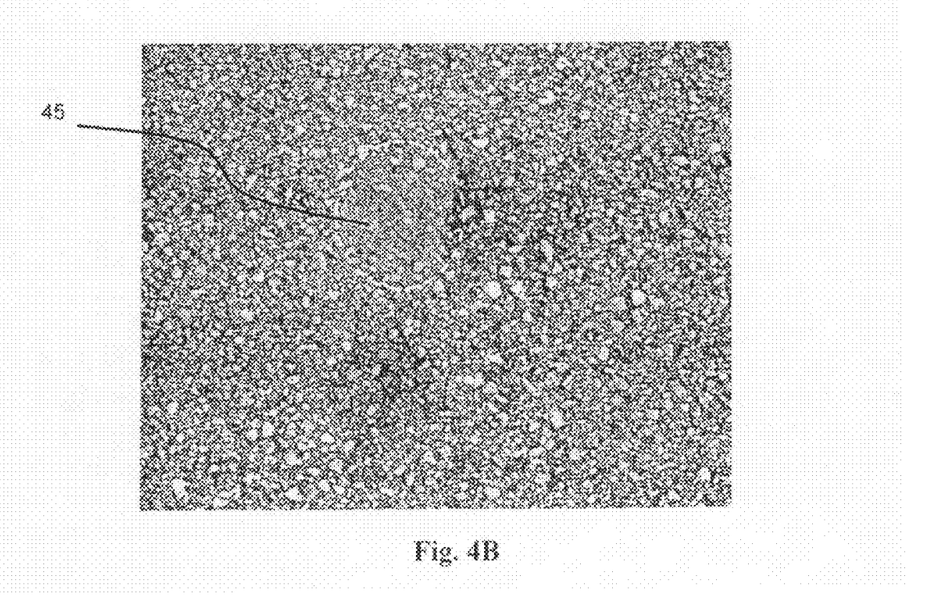
FIG. 4B is a photograph of the lube-oil stain on the asphalt driveway in FIG. 2A after treatment and 5 months of exposure to weather and traffic.

In this example, we used $TiO_2$ (manufactured by Degussa Corp.) with the following characteristics: crystallographic modification: a mixture of anatase and rutile (ratio about 3:1), surface area 50 $m^2/g$; the average particle size 30 nm. 1 g of $TiO_2$ was added to 50 ml of denatured ethanol (obtained from Fisher Scientific) and thoroughly mixed to form a suspension. The obtained suspension is very stable: the powder did not precipitate for a period of several weeks and a certain portion of $TiO_2$ particles remained in suspended state for several months and even years. Several drops of this suspension were dropped on the surface of an oil stain on asphalt such that a thin film of $TiO_2$ covered the surface of the stain after evaporation of the solvent. The procedure may be repeated if after complete drying of the solvent, the oil stain still looks too dark against the surrounding area. FIG. 4A depicts the photo of an oil stain 40 on asphalt with a portion of the surface immediately after the application of the $TiO_2$ film 42. To illustrate the contrast between treated and untreated surfaces, only a portion of the oil stain was coated with the $TiO_2$ film 42. FIG. 4B shows the same stain 45 after 5 months of the exposure to weather and heavy traffic. It is evident that the application of $TiO_2$ film has a pronounced masking effect on the lube-oil stain on asphalt, and this effect lasted for 5 months after a single application of the film.

EXAMPLE 2

Figure 5A:
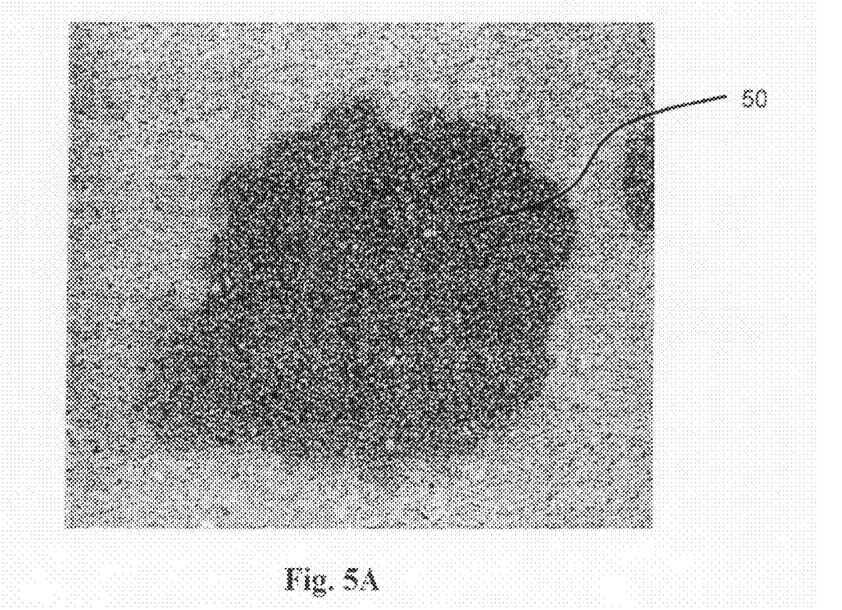
FIG. 5A is a photograph of a lube-oil stain on a concrete driveway before application of the composition film as a liquid suspension.
Figure 5B:
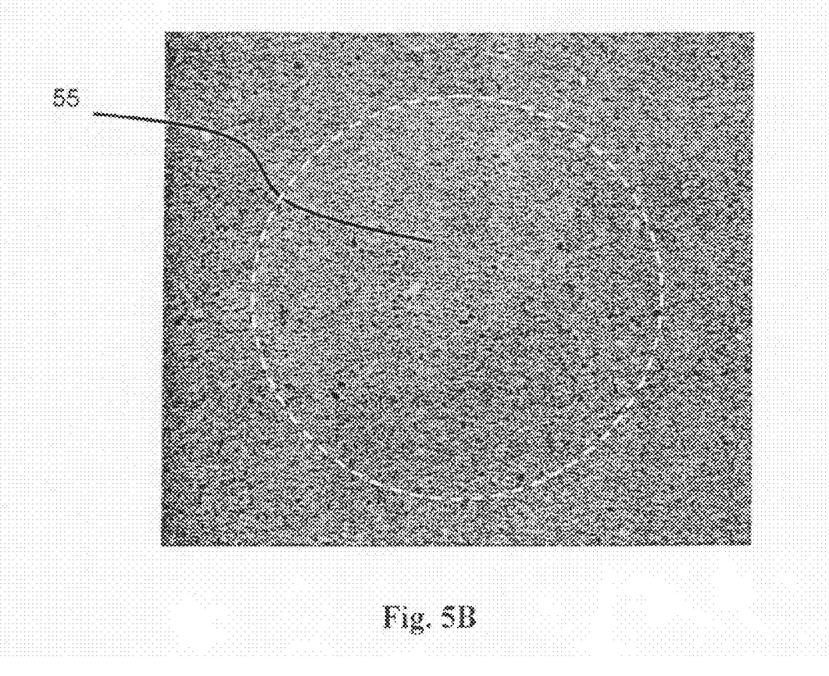
FIG. 5B is a photograph of the lube-oil stain on the concrete driveway after treatment and exposure to the elements for one month.

The $TiO_2$ suspension in ethanol, as used in Example 1, was dropped, using a conventional dropper, on the surface of a lube-oil stain occurring on a concrete driveway. The suspension was dropped in the middle of the stain and moved outward, to prevent spreading the film beyond the edges of the stain. One drop of the suspension covered about 2 $cm^2$. FIG. 5A shows the photos of the original stain 50 and FIG. 5B show the treated stain 55 after a month of exposure to the elements. Caution should be exercised when applying the coating and an effort should be made to not apply the coating beyond the edges of the stain. However, if the applied coating extends to an unstained area, or the coating is too bright against the background color of the surface to be cleaned, the excess coating could be removed by brushing with soap and water.

EXAMPLE 3

Example 3 is similar to the Example 2, except that 5 ml of aqueous colloidal solution of platinum (0.025 wt. % Pt) was added to the $TiO_2$ suspension in ethanol. In this example, Pt plays a role of a dopant that accelerates photodegradation of an oil stain. The colloidal Pt solution was obtained by mixing 2.5 ml of the aqueous solution of $H_2PtCl_6$ (0.1 wt. %) with 2.5 ml of the aqueous solution (0.01 wt. %) of the protective polymer (polyvinyl alcohol) followed by adding 0.1 g of sodium borohydride ($NaBH_4$) to the mixture under well-stirred conditions at room temperature until all hydrogen bubbles ceased to evolve. The $TiO_2$-Pt suspension in ethanol was used for photodegradation of lube-oil stains on a concrete driveway. Pt nanoparticles impart a grayish color to the $TiO_2$ suspension, which provides a better masking effect, if used on a gray concrete surface.

EXAMPLE 4

In Example 4, the $TiO_2$ suspension in ethanol is similar to that prepared in Example 1, except that 0.2 g of zinc acetate ($Zn(OAc)_2$) was added to the suspension. In this example $Zn(OAc)_2$ plays a role of a dopant that accelerates photodegradation of an oil stain. The resulting suspension in ethanol was applied to a lube-oil stain on a concrete driveway to form a film that efficiently degraded the stain over 3-4 weeks.

EXAMPLE 5

In this experiment, we used $TiO_2$ with the following characteristics: crystallographic modification, primarily anatase; surface area 25 $m^2/g$; the particle size varied in the range of 0.1-1 µm. 1 g of $TiO_2$ was added to 50 ml of ethanol (denatured) to form a suspension. In contrast to Example 1, the suspension produced from this form of $TiO_2$ was not stable, and most of the particles precipitated in a matter of an hour. A piece of cloth was partially soaked with this suspension, while shaking the bottle with the suspension, and $TiO_2$ was rubbed on the surface of a lube-oil stain on concrete. The treated stain was left exposed to the elements. In a matter of 4 weeks, the stain became practically indistinguishable against the background.

EXAMPLE 6

Figure 6A:
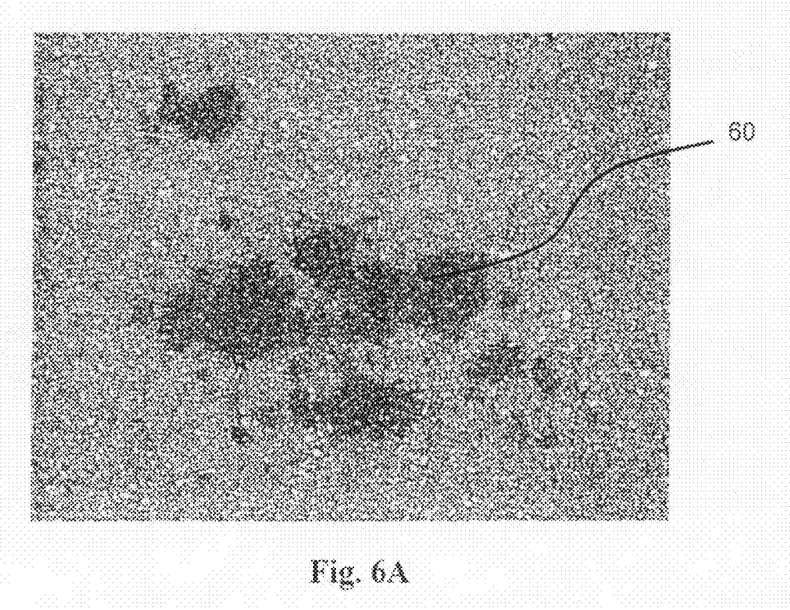
FIG. 6A is a photograph of a lube-oil stain on an asphalt driveway before applying thin film of the present invention as a solid composition.
Figure 6B:
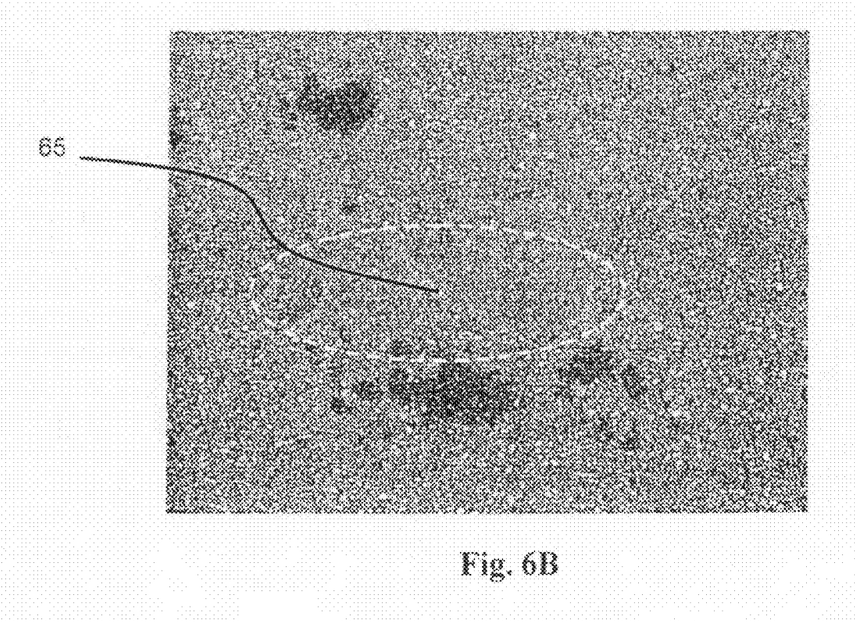
FIG. 6B is a photograph of the lube-oil stain on an asphalt driveway immediately after applying the solid form of the composition as a thin film.

In Example 6, a white Portland cement (WPC) is used as a binder with the following chemical composition (wt. %): CaO (67.1), $SiO_2$ (21.7), $Al_2O_3$ (4.4), $Fe_2O_3$ (0.2), MgO (0.5), $SO_3$ (3.3), others (2.8). 6 g of WPC was mixed with 4 g of $TiO_2$, the same modification of $TiO_2$ as used in the Example 3. 5 g of water was added to the mixture to form a paste with the consistency similar to that of yogurt. The paste was introduced into a cylindrical plastic mold having a diameter of 1.2 cm and a length of 6 cm and left undisturbed at room temperature for 24 hours. The solid WPC—$TiO_2$ composition having a cylindrical shape was released from the mold and used for the treatment of a lube-oil stain on asphalt. The lube-oil stain was shaded by the WPC—$TiO_2$ bar to cover whole surface of the stain, similar to drawing on the asphalt with a piece of a white chalk. A piece of durable cloth partially soaked with rubbing alcohol (approximately 70% isopropanol, and approximately 30% water) was used to rub the white powder on the surface of the stain until it becomes almost indistinguishable against the surroundings. FIGS. 6A and 6B provide an illustration of Example 6, depicting the photos of an original stain 60 and treated oil stain 65 on asphalt. For the sake of comparison, only a portion of the stain was coated with the composition film.

EXAMPLE 7

Figure 7:
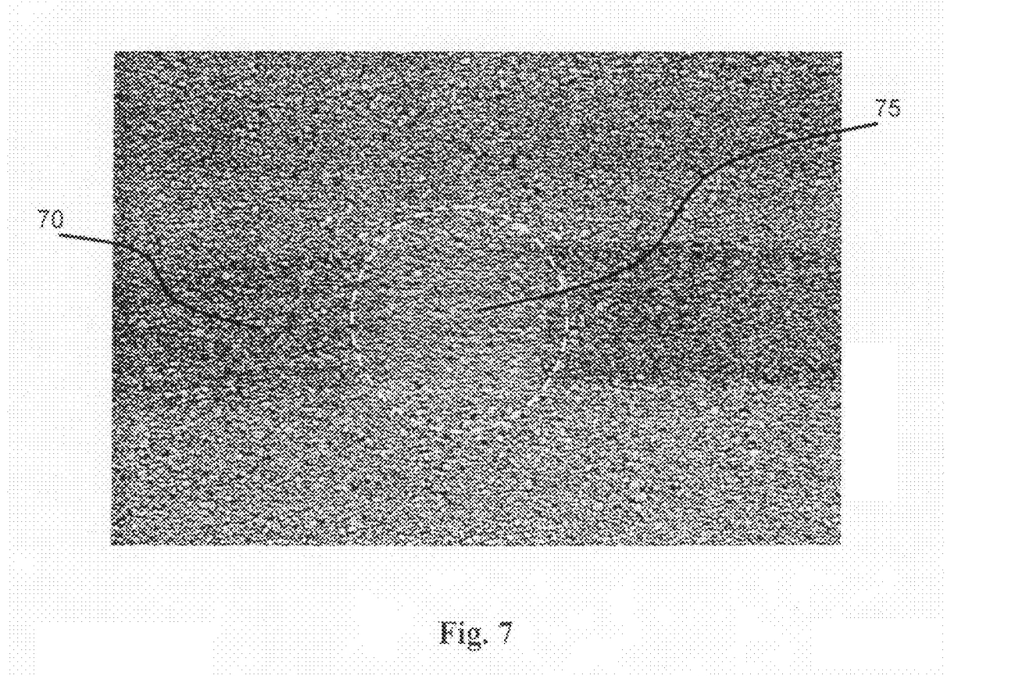
FIG. 7 is a photograph of a tire mark on an asphalt driveway with the portion of the mark treated with the solid form of the composition of the present invention.

The same technique and the solid WPC—$TiO_2$ composition in Example 6 was applied to the treatment of a tire mark on asphalt. FIG. 7 is a photo of the tire mark 70 with a treated area 75 immediately after treatment. Where treated, the mark is almost indistinguishable from the unmarked asphalt.

EXAMPLE 8

To the stain removal composition in Example 6, 0.2 grams (g) of $Fe_3O_4$ (as a black pigment) was added to the dry WPC—$TiO_2$ mixture. The resulting bar has a gray color, which provides better masking effect on gray concrete and asphalt surfaces, compared to the original white-colored WPC—$TiO_2$ composition.

EXAMPLE 9

In Example 9, 0.2 g of acetylene black from Aldrich Chemicals (as a black pigment) was added to the dry WPC—$TiO_2$ mixture of Example 6. The resulting bar has a light-gray color, which provides good masking effect on concrete and asphalt surfaces.

EXAMPLE 10

In Example 10, 0.2 g of $Fe_2O_3$ (as a red pigment) was added to the dry WPC—$TiO_2$ mixture. The resulting bar had a red-brownish color, which provided good masking effect on red brick surfaces.

EXAMPLE 11

The stain masking and removal composition is similar to Example 6, except that 0.1 g of $SnO_2$ (as a dopant) was added to a dry WPC—$TiO_2$ mixture. The resulting solid WPC—$TiO_2$-$SnO_2$ composition more efficiently degraded a lube-oil stain compared to the original composition (i.e., without a dopant).

EXAMPLE 12

The stain masking and removal technique and composition similar to that in Example 6 is used, except that 4 g of ZnO (surface area 13.4 $m^2$/g; the average particle size 0.5-1 μm) was mixed with 6 g of WPC to form a dry WPC—ZnO mixture. The resulting WPC—ZnO composition efficiently photo-degraded lube-oil stains on concrete surface in a manner that is comparable to WPC—$TiO_2$ compositions.

EXAMPLE 13

Conditions were the similar to those in Example 6, except that 5 g of $TiO_2$ (the same reagent as in Example 5) was mixed with 5 g of gypsum (Plaster of Paris) to form a dry gypsum-$TiO_2$ mixture. Water was added to this mixture to form a paste with the consistency of yogurt. The paste mixture is allowed to harden in a mold. A lube-oil stain was shaded by the solid composition to cover the whole surface of the stain, similar to drawing on the asphalt with a piece of a white chalk. A piece of durable cloth partially soaked with rubbing alcohol (approximately 70% isopropanol, and approximately 30% water) was used to rub the powder on the surface of the stain until it becomes almost indistinguishable against the surroundings. The resulting gypsum-$TiO_2$ solid composition efficiently photo-degraded lube-oil stains on concrete and stone surfaces.

EXAMPLE 14

Example 14 relates to the treatment of a rust stain on concrete surface. Two (2) g of oxalic acid was mixed with 10 g of gypsum and 1 g of TiO2, the same reagent as in Example 5. Water was added to this mixture to form a paste with the consistency of yogurt. The paste mixture is allowed to harden in a mold. A rust stain was shaded by the solid composition to cover the whole surface of the stain, similar to drawing on the concrete with a piece of a white chalk. A piece of durable cloth partially soaked with rubbing alcohol (approximately 70% isopropanol, and approximately 30% water) was used to rub the powder on the surface of the rust stain until it becomes almost indistinguishable against the surroundings. The resulting solid composition efficiently removed the rust stain from the concrete surface.

The experiments above have demonstrated that the kit form of the invention shown in FIG. 3 can be used to apply the novel composition to most stains in less than approximately 30 minutes, and preferably in less than approximately 5 minutes. In less than approximately 180 days and preferably in less than approximately 30 days, the entire stain can become distinguishable against the surroundings.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A method for masking and subsequently removing unsightly stains from rugged solid surfaces comprising the steps of:
   (a) providing a rugged, solid surface having a consistent color with a stain of a different color than the surface selected from the group consisting of asphalt pavement, concrete, marble and stone;
   (b) coating the entire stain with a durable thin film of a composition consisting essentially of:
   titanium dioxide as a photocatalyst,
   a dopant selected from the group consisting of platinum, tin oxide, and mixtures thereof,
   a co-reagent selected from the group consisting of oxalic acid, citric acid, sodium citrate, potassium hydrogen tartrate, sodium phosphate, sodium hydrosulfite and silicic acid that masks the stain; and
   (c) exposing the coated stain to an environmental element selected from the group consisting of a light source and air, rain, humidity, pedestrian traffic vehicular traffic or a combination thereof that degrades and removes the stain from the surface.

2. The method of claim 1, wherein the composition further includes one or more components selected from the group consisting of a sensitizer, a mediator, a pigment and a binder.

3. The method of claim 2, wherein the mediator is selected from the group consisting of zeolites, activated carbon, carbon black, acetylene black and silica gel.

4. The method of claim 2, wherein the pigment is selected from the group consisting of $TiO_2$, $ZnO$, $Fe_2O_3$, $Fe_3O_4$, $NiFe_2O_4$, activated carbon and carbon black wherein if $TiO_2$ is used, it will have a different color that the color provided by the photocatalyst.

5. The method of claim 2, wherein the binder is selected from the group consisting of white Portland cement, Portland cement, gypsum, ceramic cement, stucco and marcite.

6. The method of claim 5, wherein the binder is white Portland cement.

7. The method of claim 1, wherein the durable thin film is produced by applying a suspension of the composition in a solvent.

8. The method of claim 7, wherein the solvent is selected from the group consisting of water, ethanol, acetone, isopropanol, octane and a mixture thereof.

9. The method of claim 7, wherein the suspension of the composition is applied by spray-coating onto the stain surface.

10. The method of claim 7, wherein the suspension of the composition is applied by soaking a liquid-absorbing material with the suspension and rubbing the suspension-soaked material on the stain surface.

11. The method of claim 1, wherein the coating step includes the step of:
   applying the composition in the form of a loose powder or pellets followed by the step of rubbing the composition on the stain surface with a solvent-soaked material.

12. The method of claim 1, wherein the coating step includes the step of:
   shading the stain with the composition in a solid form followed by the step of rubbing the composition on the stain surface with a solvent-soaked material.

13. The method of claim 1, wherein the light source that degrades and removes the stain is solar radiation.

14. The method of claim 1, wherein the light source that degrades and removes the stain is selected from one of a black light and white cool fluorescent lamps.

15. The method of claim 1, wherein the stain of a different color than the surface is masked in a period of less than approximately 30 minutes, and the stain is removed in a period of time less than approximately 180 days.

16. The method of claim 15, wherein the stain of a different color than the surface is masked in a period of time up to approximately 5 minutes and removed in a period of time of less than approximately 30 days.

17. A method for masking and subsequently removing unsightly stains from rugged solid surfaces comprising the steps of:
   (a) providing a rugged, solid surface having a consistent color with a stain of a different color than the surface selected from the group consisting of asphalt pavement concrete, marble and stone;
   (b) coating the entire stain with a datable thin film of a liquid composition consisting essentially of:
   titanium dioxide as a photocatalyst in a concentration range of approximately 0.1 weight percent to approximately 40 weight percent,
   platinum as a dopant in a concentration range or approximately 0.0001 weight percent to approximately 5 weight percent,
   tris (2,2'-bipyridyl) ruthenium (II) chloride as a sensitizer in a concentration range of approximately 0.0001 weight percent to approximately 5 weight percent,
   silica gel as a mediator in a concentration range of approximately 1 weight percent to approximately 20 weight percent,
   oxalic acid as a co-reagent in a concentration range of approximately 1 weight percent to approximately 20 weight percent, and
   ethanol as a solvent in a concentration range of approximately 40 weight percent to approximately 99.9 weight percent; and
   (c) exposing the coated stain to an environmental element selected from the group consisting a light source air, rain, humidity, pedestrian traffic vehicular traffic or a combination thereof that degrades and removes the stain from the surface.

18. The method of claim 17 that further includes an iron oxide pigment in a concentration range of approximately 0.1 weight percent to approximately 10 weight percent in the liquid composition for masking and subsequently removing stains.

19. A method for masking and subsequently removing unsightly stains from rugged solid surfaces comprising the steps of:
   (a) providing a rugged, solid surface having a consistent color with a stain of a different color than the surface selected flop the group consisting of asphalt pavement, concrete, marble and stone;
   (b) coating the entire stain with a durable thin film of a solid composition consisting essentially of:
   titanium dioxide as a photocatalyst in a concentration range of approximately 1 weight percent to approximately 70 weight percent,
   tin oxide ($SnO_2$) as a dopant in a concentration range of approximately 0.01 weight percent to approximately 5 weight percent.
   tris (2,2'-bipyridyl) ruthenium (II) chloride as a sensitizer in a concentration range of approximately 0.1 weight percent to approximately 5 weight percent, silica gel as a mediator in a concentration range of approximately 1 weight percent to approximately 20 weight percent, oxalic acid as a co-reagent in a concentration range of approximately 1 weight percent to approximately 40 weight percent, and white Portland cement as a binder in a concentration range of approximately 30 weight percent to approximately 99 weight percent to form a solid composition;

(c) rubbing a piece of durable cloth partially soaked in an organic solution of approximately 70% isopropanol and approximately 30% water over the solid composition on the surface of the stain until it becomes almost indistinguishable against the surrounding surface; and (d) exposing the coated stain to an environment selected from the group consisting a light source and air, rain, humidity, pedestrian traffic vehicular traffic or a combination thereof that degrades and removes the stain from the surface.

20. The method of claim 19 that further includes an iron oxide pigment in a concentration range of approximately 0.1 weight percent to approximately 10 weight percent in the solid composition fin masking and subsequent removal of stains.

* * * * *